United States Patent [19]

Parker et al.

[11] 4,054,151

[45] Oct. 18, 1977

[54] CONCENTRATING VORTEX SHAKER

[75] Inventors: Bernard Parker, Westport, Conn.;
Otto Gross, Bergenfield; Joseph Buchler, Fort Lee, both of N.J.

[73] Assignee: Buchler Instruments, Division of Searle Diagnostics Inc., Fort Lee, N.J.

[21] Appl. No.: 665,280

[22] Filed: Mar. 9, 1976

Related U.S. Application Data

[62] Division of Ser. No. 471,751, May 20, 1974, Pat. No. 3,944,188.

[51] Int. Cl.² .................................... G05D 11/00
[52] U.S. Cl. .................................... 137/110; 137/861;
137/111; 137/596; 137/599; 137/487;
137/487.5; 91/28
[58] Field of Search ............. 137/DIG. 8, 110, 111,
137/608, 606, 487, 487.5, 596, 599; 91/28, 29

[56] References Cited

U.S. PATENT DOCUMENTS

| | | | |
|---|---|---|---|
| 2,146,930 | 2/1939 | Bassett et al. | 137/606 |
| 3,055,389 | 9/1962 | Brunner | 137/487.5 |
| 3,308,846 | 3/1967 | Yuile | 137/487.5 |
| 3,556,146 | 1/1971 | Vecht | 137/606 |
| 3,572,363 | 3/1971 | Roach | 137/110 |

*Primary Examiner*—William R. Cline
*Assistant Examiner*—H. Jay Spiegel
*Attorney, Agent, or Firm*—Karl F. Ross

[57] ABSTRACT

A concentrating vortex shaker for the simultaneous shaking and concentration of a multiplicity of liquid samples comprises a heat-conductive block having a plurality of openings for receiving laboratory vessels containing sample liquids and removably mounted on a base provided with an adjustable eccentric drive for displacing the block in a gyrating motion. An airtight cover is removably mounted on the block and forms a chamber above the samples which can be controllably evacuated. The samples can be heated or cooled by a temperature-controlled liquid which is fed through a channel formed in the block or heated by an adjustable electrical heater provided in the block mounting or cooled by a cooling plate, upon which the block mounts.

2 Claims, 7 Drawing Figures

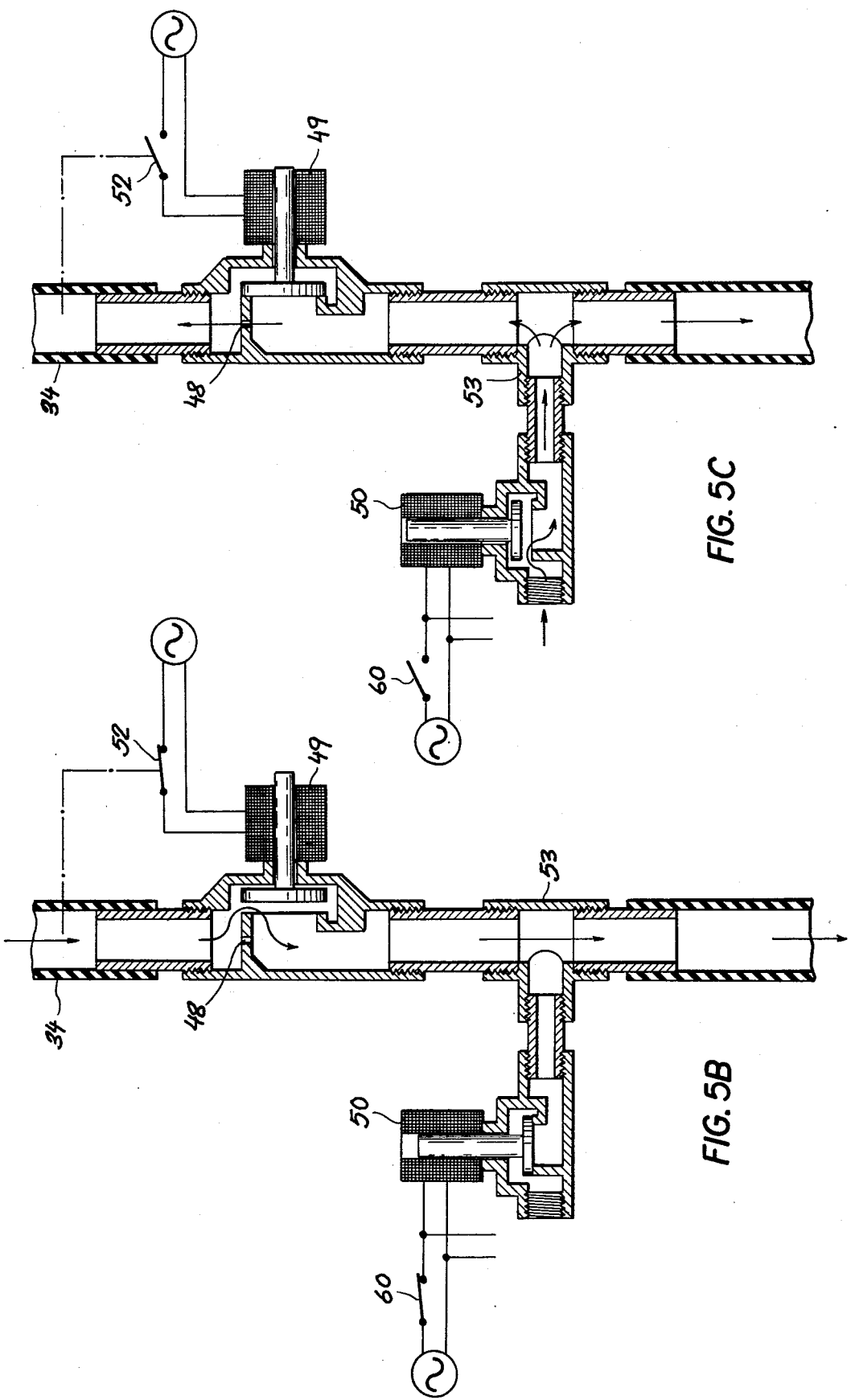

CONCENTRATING VORTEX SHAKER

This is a division of application Ser. No. 471,751, filed May 20, 1974 now U.S. Pat. No. 3,944,188 issued Mar. 16, 1976.

FIELD OF THE INVENTION

The present invention relates to shakers and, more particularly, to shakers capable of subjecting a large number of samples, which can be quickly interchanged, to conditions of gyration, heating, cooling, evaporation and evacuation.

BACKGROUND OF THE INVENTION

In scientific laboratory work, it frequently becomes necessary to subject a large number of various samples to gyrating motion (mixing), to heating or cooling, and to evaporation and evacuation, sometimes simultaneously. Devices for performing these tasks separately are readily available but have the disadvantage in that the samples, usually in small numbers, must tediously be transferred from device to device between operations. Although there are some shakers which can perform multiple operations, none to our knowledge can perform all of the above mentioned operations in a simple, compact and readiy accessible device. In systems having vacuum facilities, there is usually the problem of "bumping", resulting in a loss of some of the sample liquid due to splashing or violent boiling caused by the very rapid build-up of vacuum applied to the sample.

OBJECTS OF THE INVENTION

It is therefore an object of the present invention to provide an improved shaker apparatus which can subject samples placed therein to gyrating motion, to heating or cooling, and to evaporation and evacuation, simultaneously or in any combination.

It is another object of the invention to provide an improved shaker apparatus capable of eliminating vacuum bumping.

It is a further object of the invention to provide a shaker apparatus with facilities for the quick exchange of large numbers of samples.

SUMMARY OF THE INVENTION

The above and other objects of the invention are achieved in a shaker apparatus having a base containing a drive assembly which is connected through an eccentric to a heater assembly and optional cooling plate upon which is mounted a thermally conductive vessel block for holding liquid samples to be treated.

The vessel block has, in its upper portion, a large number of openings holding sample laboratory vessels of various size and shape such as tubes, vials and flasks, specific blocks being provided for specific vessels. The vessel blocks can be quickly interchanged by releasing a single shaft having a knurled top which is used to secure the block to the heater assembly.

A tortuous channel is formed in the lower half of the block and connected by nipples and flexible tubing to a source of temperature controlled liquid which can be passed through the channel for cooling or heating the samples in the block, which is made of a highly thermally conductive material such as aluminum.

Alternatively, only cooled liquid can be passed through the channel, the block being heated by an assembly which comprises a silicone rubber heater plate and a thermistor, connected to a control mounted on the base, for adjusting the temperature. However, where required, the only temperature control can be that provided by the heater assembly.

Alternatively, if the block has no channels, the heating can be done by the same heater assembly on which a cooling plate can be mounted through which temperature controlled coolant is circulated. Hereby an optional cooling system is added, which can be mounted or removed at will.

A transparent cover is fitted over the top of the vessel block and held in place by catches provided on the block, the cover forming a chamber above the samples, which is made airtight by a gasket between the cover and the block. A vacuum can be created in the chamber by removing the air therein through a passageway formed in the vessel block and connected through a plug-in fitting with a flexible tube which feeds through a vacuum control system to a vacuum source.

The electrically operated automatic vacuum control system, provides a means for drawing a vacuum from a constant suction source. The vacuum at the start is very low and then slowly increases to its full volume. This method, in conjunction with the gyrating motion of the sample, avoids the bumping effect encountered with other systems of this type. An automatic bleeder valve, electrically controlled which is another part of the vacuum control system, opens the moment the vacuum source is shut off, to bleed air into the vacuum chamber, thereby preventing oil or water from being drawn into the vacuum chamber and protecting the samples from destruction.

An alternate manual vacuum control system can also be provided.

A gyratory motion is imparted to the vessel block and heater assembly by the eccentric, which forms part of the drive assembly. A counterweight is provided for dynamic balancing of the mass of the vessel block and heater assembly during gyration, thereby preventing unwanted vibrations from being imparted to the entire shaker apparatus. The vessel block and heater assembly are held against rotation by a number of springs (or other restraints) which are connected between the heater assembly and the base, the springs allowing gyrating motion without rotation.

The gyrating motion of the vessel block, which is adjustable by a motor-speed control provided in the base, causes the sample vessels, which are held in close fitting openings, to make contact along their sides with the vessel block, thereby improving heat transfer between the vessels to be heated or cooled and the temperature controlled block. The gyration also causes the sample liquids in the vessels to climb the sides thereof, presenting a larger surface to be subjected to evaporation or evacuation.

BRIEF DESCRIPTION OF THE DRAWINGS

The above and other features of the invention will now be described in detail with reference to the drawings in which:

FIG. 5B is a sectional view of the vacuum system of FIG. 5A in normal operation; and FIG. 5C is a sectional view of the vacuum system shown in FIG. 5A and FIG. 5B in the air-bleeding position.

SPECIFIC DESCRIPTION

Figure 1:
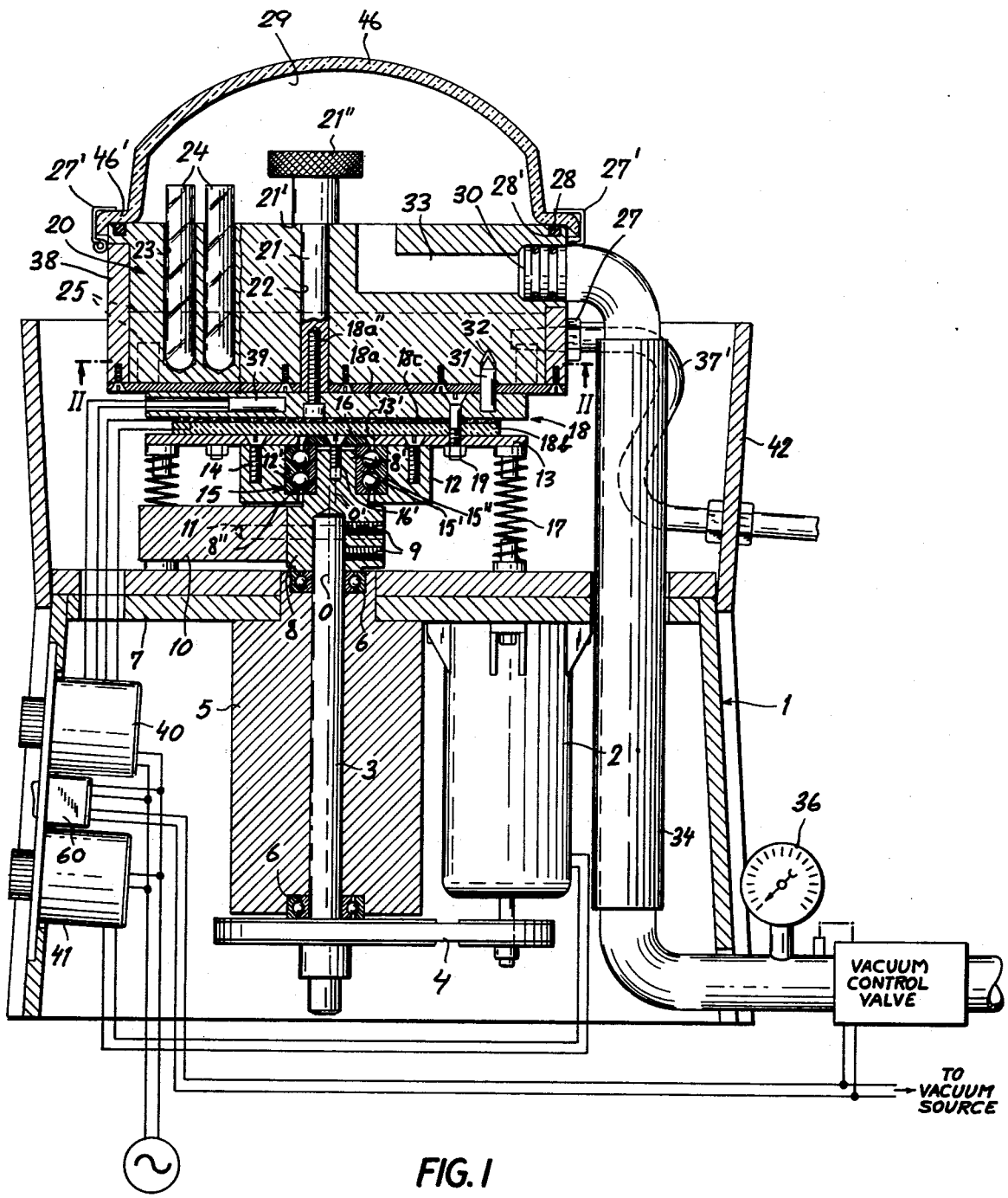
FIG. 1 is a sectional view of a shaker apparatus according to the invention.

FIG. 1 shows a shaker apparatus having a base 1 in which a motor 2 is provided for driving a vertical shaft 3 by way of a pulley arrangement 4. The shaft 3 is journaled in a block 5 by bearings 6, the block 5 being mounted on the top 7 of base 1, with the upper end of shaft 3 passing through the top 7 and engaging an eccentric 8, which is locked to the shaft 3 by setscrews 9. A counterweight 10 is attached to the eccentric 8 by screws 11 (only one shown in dotted lines), the eccentric 8 being provided with an upwardly extending, cylindrical extension 8' whose axis 0' is parallel to and offset from the axis 0 of shaft 3.

A bearing block 12 has a recess 12' into which is fitted a bearing 15, having an inner race 15' which surrounds the extension 8' and is held in place there between a washer 16, fastened to extension 8' and is held in place there between a washer 16, fastened to extension 8' by a screw 16' and a shoulder 8", formed on eccentric 8. A mounting plate 13 is attached to the block 12 by screws 14 and is provided with a central opening 13' which surrounds the washer 16, the plate 13 overlying the outer race 15" of bearing 15. The plate 13 is also provided with springs 17 which are attached to the top 7 of base 1 for biasing the plate 13 against rotation and providing additional support for the block 20.

A heater assembly 18 is mounted on plate 13 by screws 19 and comprises a heat conducting plate 18d and a thermal insulating plate 18b between hich isprovided a silicone rubber electric-resistance heater of conventional design 18c.

A vessel-holding block 20 is removably mounted on heater assembly 18 by a shaft 21, passing through a bore 22 formed in block 20 and threadedly engaging a stud 18a''' provided on plate 18a, a shouler 21' formed on shaft 21 being provided for engaging and holding block 20 in place on the heater assembly.

Figure 2:
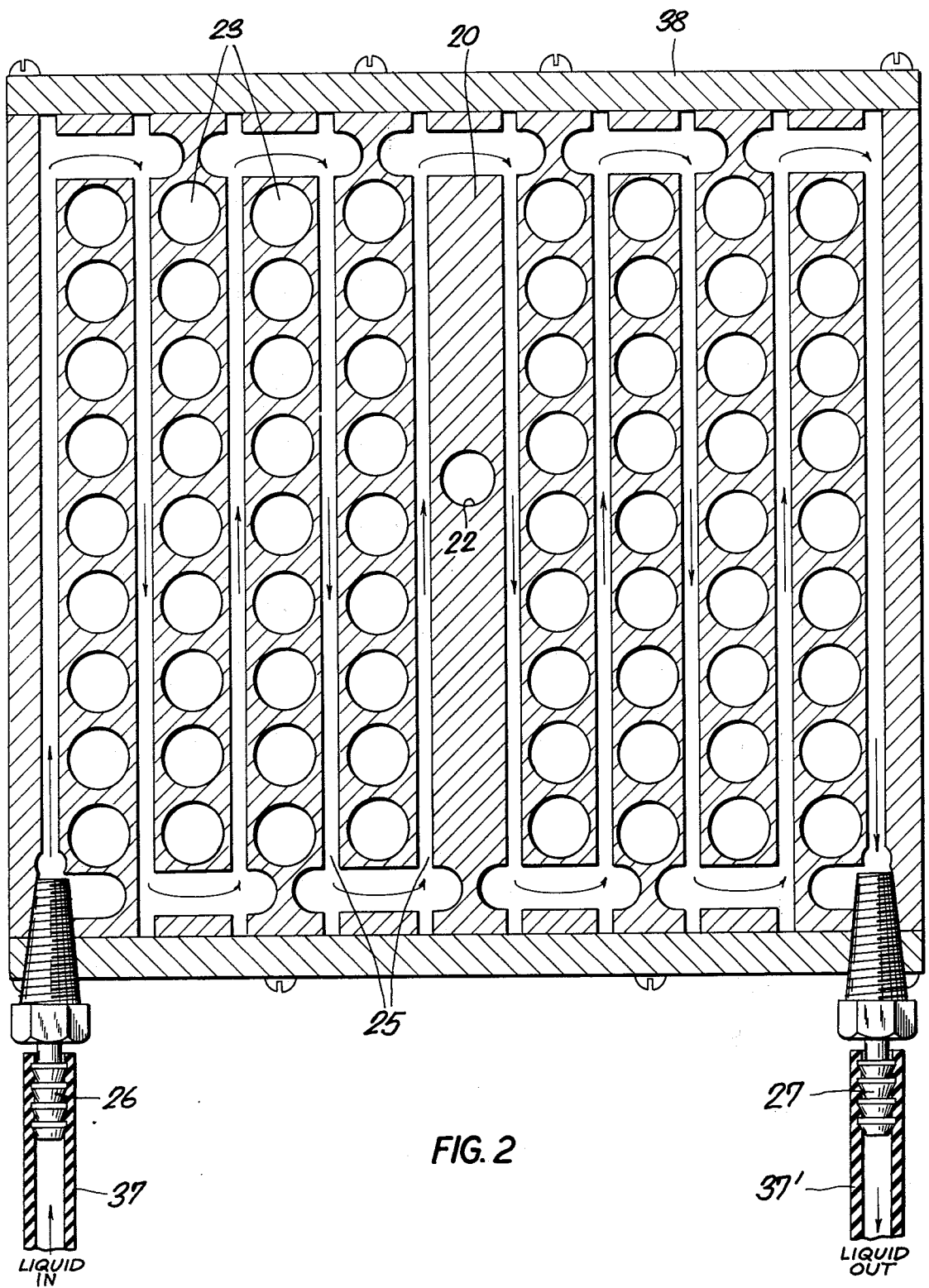
FIG. 2 is a view taken along line II—II of FIG. 1.

The block 20 is provided with an array of openings 23, as can best be seen in FIG. 2, for holding sample vessels, such as those shown at 24. A channel 25 is formed in the lower half of block 20 for passing a temperature-controlled liquid in an undulating path past the openings 23, the liquid entering the block 20 through a nipple 26 and leaving through a nipple 27. A jacket 38 surrounds the sides and bottom of block 20 for confining the liquid within the channels 25, which are open at the bottom and two sides of block 20.

A cover 46, made of plastic or glass for visibility (or metal) overlies the block 20 and has a skirt 46' which rests along the edges of the block, engageable by catches 27 to the block 20. A sealing ring 28 provided in a groove 28' formed in the top of block 20, provides an airtight gasket for the chamber 29, formed between the cover 46 and the block 20, the sealing ring 28 engaging the skirt 46'.

In operation, the block 20 can be removed from the shaker by loosening the shaft 21 by the knurled knob 21'' provided thereon and disconnecting the nipples 26, 27 and vacuum connector 30 from the block, if remote sample loading is desired or replacement with a preloaded vessel block. The loaded vessel block, which can have different size and shaped openings for different kinds of sample vessels, is placed on the heater assembly 18 of the shaker and oriented thereon by an indexing pin 31 provided on plate 18a, engaging with a bore 32 in block 20 and locked into place by the shaft 21. The transparent cover 46 is then placed on the block 20 and the catches 27 are engaged.

Figure 3:
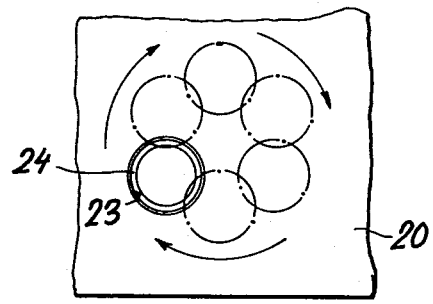
FIG. 3 is a top view of a portion of FIG. 1.

The samples contained in the vessels 24 can be subject to a variety of conditions, such as gyrating motion, as shown in FIG. 3, or evacuation, heating, cooling and evaporation, all at the same time or separately or in any combination.

Figure 5A:
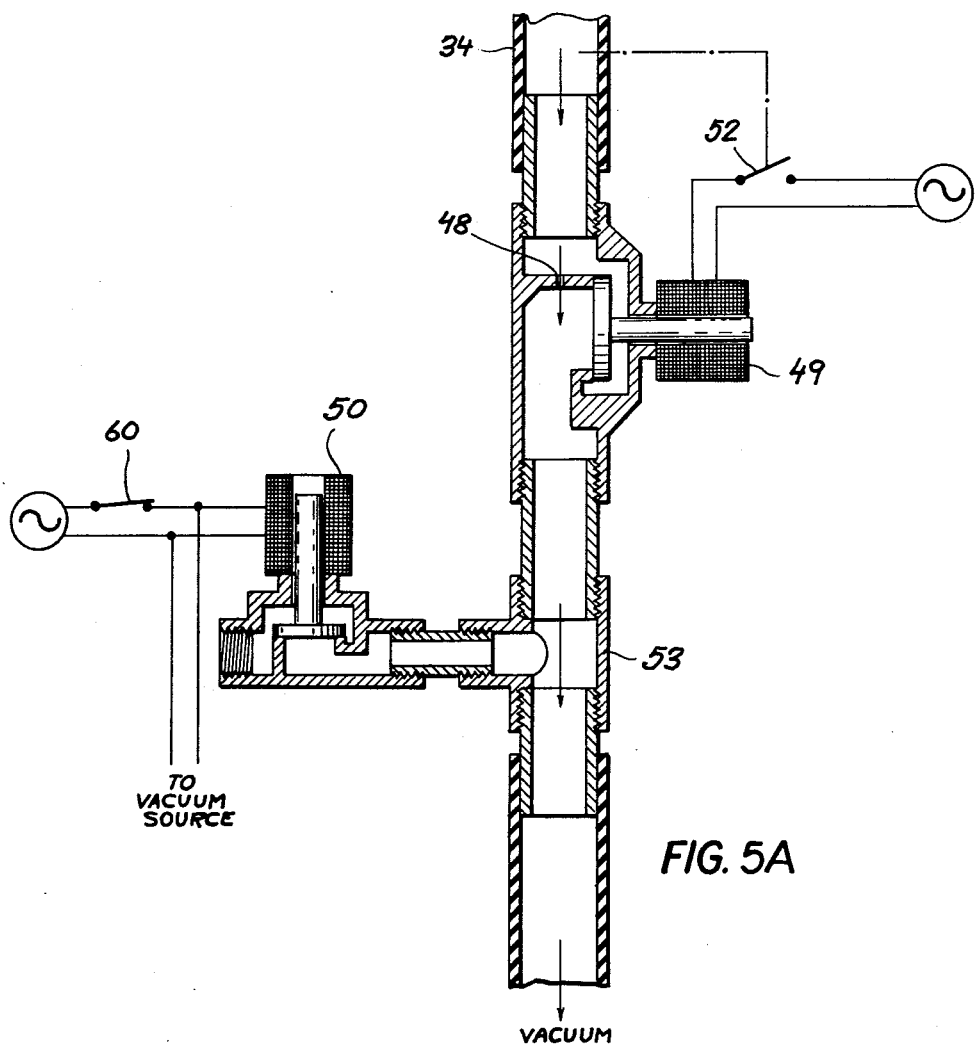
FIG. 5A is a sectional view of a vacuum control system showing the slow buildup of vacuum.

A vacuum can be applied to the chamber 29 through a passageway 33 formed in the block 20 and communicating through a connector 30 with a flexible vacuum line 34 provided with an automatic control valve system shown in FIGS. 5A, 5B and 5C for gradually building up the vacuum in chamber 29, provided by a vacuum source not shown and a vacuum gage 36 for monitoring the amount of vacuum present in the line 34.

The system employs one large orifice solenoid valve 49 normally closed, connected to a vacuum sensitive switch 52 set to close at a pressure of 25 IN Hg. A small orifice solenoid valve 50, normally open, acts as a bleeder valve. The three components are electrically connected by wiring and mechanically connected by pipe fittings and flexible tubing. The solenoid valve 49 is connected to the vacuum chamber 29 by the vacuum connector 30 and flexible tubing 34. On the other side solenod valve 49 is connected to a vacuum source (pump, aspirator) not shown. Connected to this flow system by means of a tee 53 is the bleeder valve 50 which bleeds outside air into the system to break the vacuum at the end of the operation thereby preventing oil or water from being drawn into chamber 29. One wall inside the solenoid valve 49 is pierced by a fine bypass nozzle 4 which permits air to flow or vacuum to be pulled very slowly. This nozzle 48 is permanently open. After the instrument has been prepared for vacuum operation, the vacuum source is turned on by means of a multiple function switch 60. The bleeder valve 50, normally open, is now energized — closed solenoid valve 49 remains closed. The air in the vacuum chamber 29 (not shown) is now slowly exhausted through the by-pass nozzle 48. When the vacuum reaches 25 IN. Hg the vacuum sensitive switch 52 activates the solenoid valve 49 which is energized open. This now permits the vacuum to be pulled at full volume until the end of operation.

The samples contained in vessel block 20 can be subjected to cooling by passing a cooled liquid through the channels 25, from a flexible tube 37 connected to inlet nipple 26 and a source of controlled-temperature liquid not shown (e.g. a thermostatic bath) and leaving the vessel block 20 through the outlet nipple 27 connected to a flexible tube 37'. If heating of the samples contained in vessel block 20 is desired a heated liquid can be passed through the block in the same manner as that described for the cooling of the samples.

An alternative method for heating the samples contained in the vessel block 20 is provided by the heater assembly 18, which contains a thermistor 39, provided in heater plate 18a and connected to an adjustable heating control 40, which accurately adjusts the amount of heating produced by the silicone rubber heater 18c, to which it is also connected.

Figure 4:
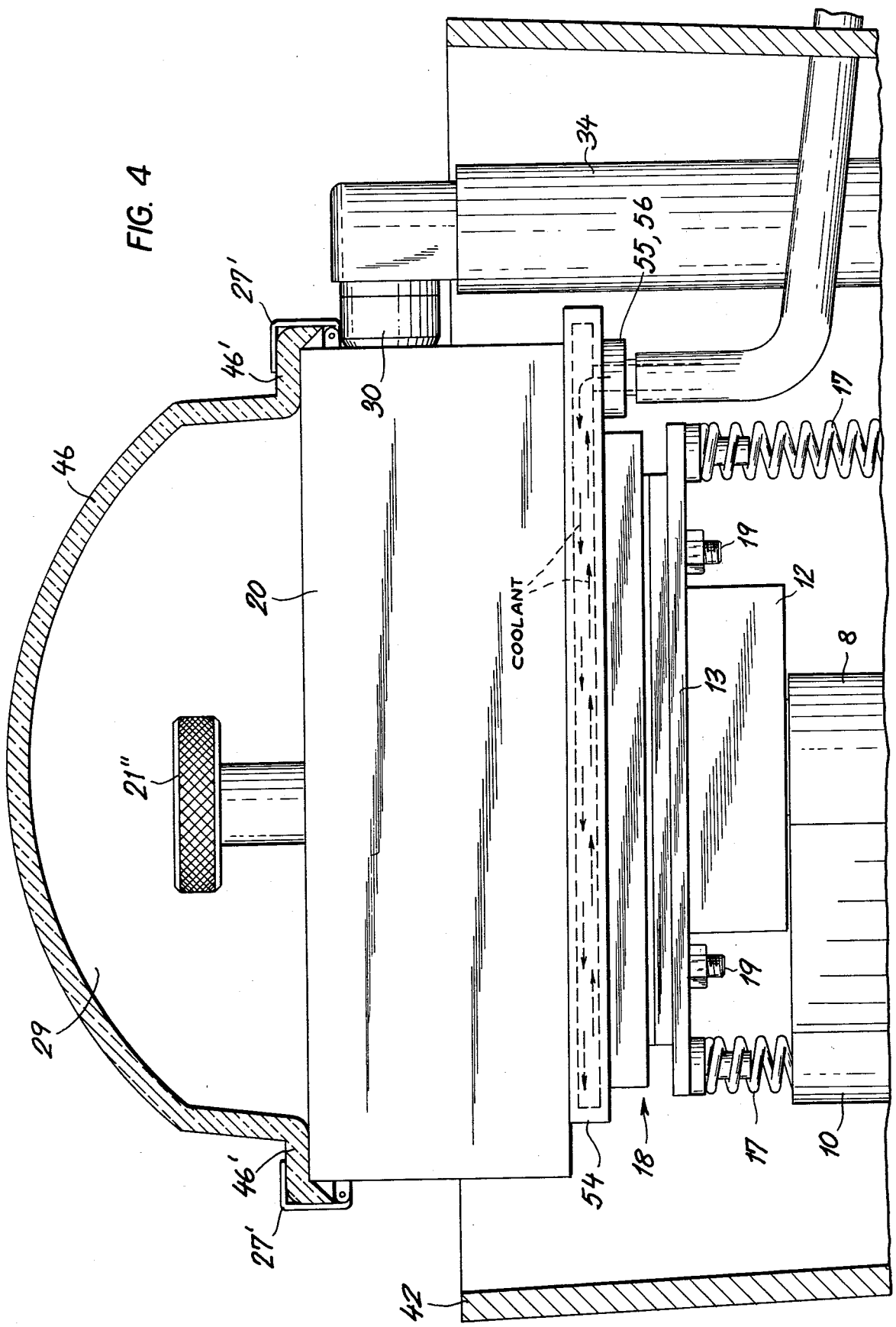
FIG. 4 is a view similar to FIG. 1 showing another embodiment.

Another alternative method is shown in FIG. 4 in which the block 20 has no channel to conduct liquid and therefore needs no nipples or flexible tubing. In this case a cooling plate 54, FIG. 4 is mounted atop the heater assembly 18.

The cooling plate 54 in turn carries the vessel block 20. The cooling plate 54 carries two nipples, 55 and 56 through which controlled coolant circulates inside cooling plate 54. The nipples 55, 56 are connected to a refrigerated liquid source (not shown) by flexible tubing. The vessel block 20 constructed without internal channels and external tube connections is now much easier to exchange.

The cooling plate 54 remains permanently connected to the unit.

The rate of gyration to which the samples are subjected is regulated by a speed control 41 to which the drive motor 2 is connected.

The entire shaker assembly is surrounded by a protective skirt 42, attached to the base 1 and extending ouwardly to just below the nipples 26, 27 and the vacuum connector 30.

We claim:

1. A vacuum control system comprising:
   a duct communicating between a chamber to be evacuated and a vacuum source;
   a first solenoid valve normally closed for controlling the flow of air in said duct between said chamber and said vacuum source;
   a second solenoid valve normally open for feeding atmospheric air to said duct between said first solenoid valve and said vacuum source;
   a nozzle in said duct for feeding a limited flow of air therethrough and connected to bypass said first solenoid valve;
   means for energizing said vacuum source and simultaneously closing said second solenoid valve;
   means responsive to a predetermined level of air pressure in said duct between said chamber and said first solenoid valve for energizing said first solenoid valve into an open position; and
   a vacuum gauge communicating with said duct between said first solenoid valve and said chamber.

2. A vacuum control chamber for a chamber to be evacuated, said control system comprising:
   a duct communicating between said chamber and a vacuum source;
   a first orifice of small cross section in said duct between said chamber and said vacuum source;
   a second orifice of large cross section in said duct between said chamber and said vacuum source, said second orifice being connected in parallel with said first orifice whereby suction is drawn through said first orifice upon blocking of the second orifice and said vacuum source communicates with said chamber through the second orifice upon unblocking thereof;
   a valve member actuatable selectively to block and unblock said second orifice;
   a solenoid energizable to actuate said member;
   a valve normally closed during the drawing of suction through one of said orifices and connected between said duct and the atmosphere, said valve being electrically energizable to vent said chamber to the atmosphere upon opening of said valve; and
   circuit means for controlling said solenoid to permit suction to be drawn through said duct and applied to said chamber via said first orifice during an initial state of evacuation of said chamber and only thereafter permittng suction to be drawn through said duct and applied to said chamber through said second orifice.

* * * * *